(12) United States Patent
Asai et al.

(10) Patent No.: US 7,976,258 B2
(45) Date of Patent: Jul. 12, 2011

(54) SCREW AND SCREW FASTENING STRUCTURE

(75) Inventors: Tetsuya Asai, Wako (JP); Yoshihiro Takitani, Wako (JP); Katsuhiro Tsukiyama, Yokohama (JP); Takehiko Egawa, Yokohama (JP)

(73) Assignees: Saga Tekkohsho Co., Ltd., Saga (JP); Honda Motor Co., Ltd., Tokyo (JP)

( * ) Notice: Subject to any disclaimer, the term of this patent is extended or adjusted under 35 U.S.C. 154(b) by 403 days.

(21) Appl. No.: 11/917,412

(22) PCT Filed: Jun. 12, 2006

(86) PCT No.: PCT/JP2006/311727
§ 371 (c)(1),
(2), (4) Date: Dec. 13, 2007

(87) PCT Pub. No.: WO2006/134857
PCT Pub. Date: Dec. 21, 2006

(65) Prior Publication Data
US 2009/0290953 A1   Nov. 26, 2009

(30) Foreign Application Priority Data
Jun. 13, 2005   (JP) ................................ 2005-172263

(51) Int. Cl.
*F16B 35/04*   (2006.01)
(52) U.S. Cl. ....................... 411/424; 411/914
(58) Field of Classification Search .................. 411/424, 411/257, 901, 914; 148/267; 428/472
See application file for complete search history.

(56) References Cited

U.S. PATENT DOCUMENTS

| 5,415,702 | A | * | 5/1995 | Bishop et al. ................. 148/258 |
| 6,858,321 | B2 | * | 2/2005 | Wada et al. .................... 428/632 |
| 6,946,201 | B2 | * | 9/2005 | Preikschat et al. ......... 428/472.1 |
| 2002/0127083 | A1 | | 9/2002 | Ando et al. |
| 2003/0190492 | A1 | | 10/2003 | Wada et al. |
| 2003/0207133 | A1 | * | 11/2003 | Preikschat et al. ............ 428/472 |
| 2004/0194859 | A1 | | 10/2004 | Asou et al. |
| 2007/0243397 | A1 | * | 10/2007 | Ludwig et al. ............. 428/472.1 |

FOREIGN PATENT DOCUMENTS

| JP | 57-83710 A | 5/1982 |
| JP | 2002-184552 A | 6/2002 |
| JP | 2000-252042 A | 9/2002 |
| JP | 2003-213448 A | 7/2003 |
| WO | 96/14514 A1 | 5/1996 |
| WO | 00/44557 A1 | 8/2000 |

* cited by examiner

Primary Examiner — Gary Estremsky
(74) Attorney, Agent, or Firm — Browdy and Neimark, PLLC

(57) ABSTRACT

There is provided a screw treated by a chemical conversion coating of trivalent chromium having a torque characteristic approximately equivalent to a screw of a hexavalent chromate treatment. For the purpose, on a surface of a bolt, a zinc plating layer is formed by a zinc plating treatment. On the layer, a chemical conversion coating of trivalent chromium is also formed by a treatment of chemical conversion coatings of trivalent chromium. The coating is formed to be thin and soft so that the zinc-based plating layer can be exposed on the surface due to rubbing off of the chemical conversion coating of trivalent chromium at a contact portion to a fastened member of the bolt by tightening the bolt.

1 Claim, 6 Drawing Sheets

TORQUE VS. AXIAL FORCE DIAGRAM OF NEW CHEMICAL CONVERSION COATING OF TRIVALENT CHROMIUM

TORQUE VS. AXIAL FORCE DIAGRAM OF CONVENTIONAL CHEMICAL CONVERSION COATING OF TRIVALENT CHROMIUM

TORQUE VS. AXIAL FORCE DIAGRAM OF HEXAVALENT CHROMATE COATING

SCREW AND SCREW FASTENING STRUCTURE

BACKGROUND OF THE INVENTION

1. Field of the Invention

The present invention relates to a screw and a screw fastening structure, the surface of which is provided with the treatment of plating and is provided with the treatment of a trivalent chromium-containing and hexavalent chromium-free chemical conversion coating on top of the layer thereof.

2. Description of the Related Art

Conventionally, a surface is provided with the treatment of plating and also provided with a chromate conversion coating thereon for preventing screws from corroding. Among the chromate conversion coatings, especially a hexavalent chromate conversion coating presents high moisture content, comparatively soft and has excellent corrosion resistance because of a self-healing action which is a characteristic feature thereof. However, since a hexavalent chromium is hazardous to human bodies, and results in the environmental pollution and the like, the use of a hexavalent chromium is substantially restricted in the world. Consequently, it has been under review to replace the conventional hexavalent chromium-containing chromate treatment with the hexavalent chromium-free alternative treatment. A generally acceptable alternative is chemical conversion treatment containing trivalent chromium compounds. A patent document disclosing such alternatives is for example Japanese Translation of Unexamined PCT Appln. No. 2000-509434.

However, a screw provided with the treatment of general trivalent chromium-containing chemical conversion coatings has a problem that a torque characteristic drops in fastening and, especially, a loosening torque decreases greatly because a chromate conversion coating of trivalent chromium is harder than a hexavalent chromate conversion coating. A considerable difference is generated between a torque characteristic in the treatment of chemical conversion coatings of trivalent chromium and hexavalent chromate treatment especially in the case of the application of a bolt to a high axial force range among other screws, for example a crank pulley bolt and the like. To be more specific, the loosening torque of the bolt by the treatment of chemical conversion coatings of trivalent chromium declines by 10% to 30% compared to the bolt by the hexavalent chromate treatment. This is nothing less than a decrease in a fastening force of the bolt applied for fixing a structure member. Therefore, functions guaranteed by a bolt of the conventional hexavalent chromate treatment could not be satisfied. In addition, a general treatment of chemical conversion coatings of trivalent chromium has adopted a multilayer structure in which other metal compositions are contained in the coating, a $SiO_2$-containing layer or coating is added on the surface, and the like, in order to compensate corrosion resistance properties originally inferior to hexavalent chromium. Consequently, a chemical conversion coating of trivalent chromium becomes harder and exerts such a great influence to the torque characteristic of the screw as especially a loosening characteristic is made deteriorating and the like.

SUMMARY OF THE INVENTION

The present invention has been devised to solve the above-mentioned conventional problems. An object of the present invention is to provide a screw and a screw fastening structure treated by a chemical conversion coating of trivalent chromium having a torque characteristic approximately equivalent to the screw of a hexavalent chromate treatment.

To achieve the above-mentioned object, according to the present invention, there is provided a screw including a zinc-based plating layer formed on the surface of the screw and a hexavalent chromium-free chemical conversion coating of trivalent chromium formed on the zinc-based plating layer, wherein a layer thickness of the chemical conversion coating of trivalent chromium at least at a contact portion to a member fastened by the screw is thinly formed so that the zinc-based plating layer can be exposed due to rubbing off of the chemical conversion coating of trivalent chromium at a contact portion of the screw by tightening the screw to make the screw contact the fastened member. Here, the layer thickness of the chemical conversion coating of trivalent chromium is set to be within a range of 50 nanometers (abbreviated as nm hereinafter) or more to less than 100 nm.

In addition, according to the present invention, there is provided a screw fastening structure in which metal members are fastened between themselves by tightening a screw, wherein a zinc-based plating layer is formed on at least a contact portion of either the metal member or the screw, and a hexavalent chromium-free chemical conversion coating of trivalent chromium is formed on the zinc-based plating layer, and a layer thickness of the chemical conversion coating of trivalent chromium is thinly formed so that the zinc-based plating layer can be exposed due to rubbing off of the chemical conversion coating of trivalent chromium at the contact portion by tightening the screw. Here, the layer thickness of the chemical conversion coating of trivalent chromium is set to be within a range of 50 nm or more to less than 100 nm.

According to the above-mentioned constitution of the present invention, the chemical conversion coating of trivalent chromium is rubbed off at the contact portion of the screw to a member fastened by tightening the screw to cause the zinc-based plating layer to be exposed. Therefore, there is provided a screw which can achieve a high torque characteristic approximately equivalent to a screw of a conventional hexavalent chromate treatment because of a friction force higher than a chemical conversion coating of trivalent chromium formed on a zinc-based plating.

According to the above-mentioned constitution of the present invention, the chemical conversion coating of trivalent chromium is rubbed off in at least the contact portion of either a metal member or the screw by tightening the screw to cause the zinc-based plating layer to be exposed. Therefore, there is provided a screw fastening structure which can achieve a high torque characteristic approximately equivalent to a screw fastening structure of a conventional hexavalent chromate treatment because of a friction force higher than a chemical conversion coating of trivalent chromium formed on a zinc-based plating.

DESCRIPTION OF THE PREFERRED EMBODIMENTS

Figure 1:
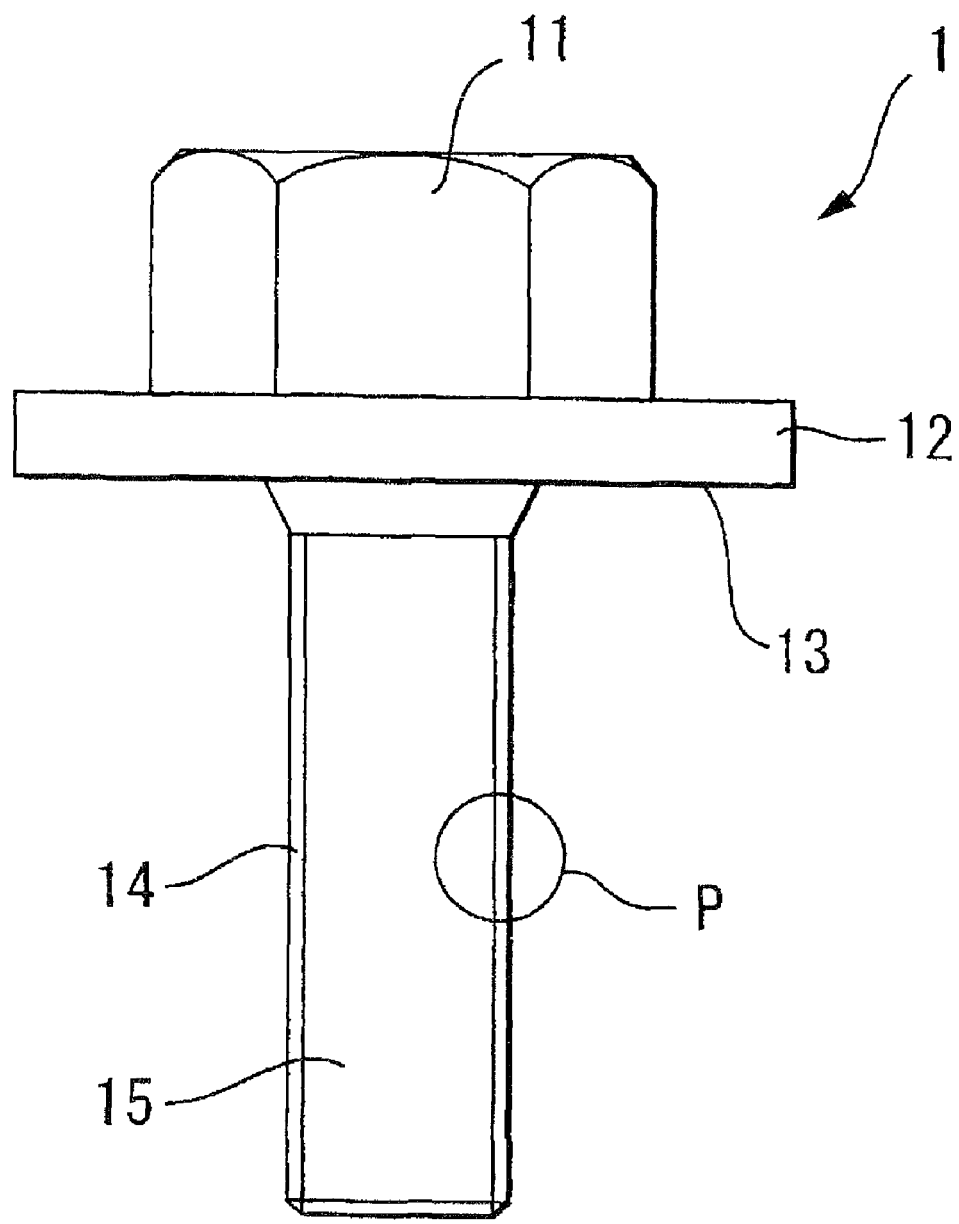
FIG. 1 is a side view of a screw according to an embodiment of the invention.
Figure 2:
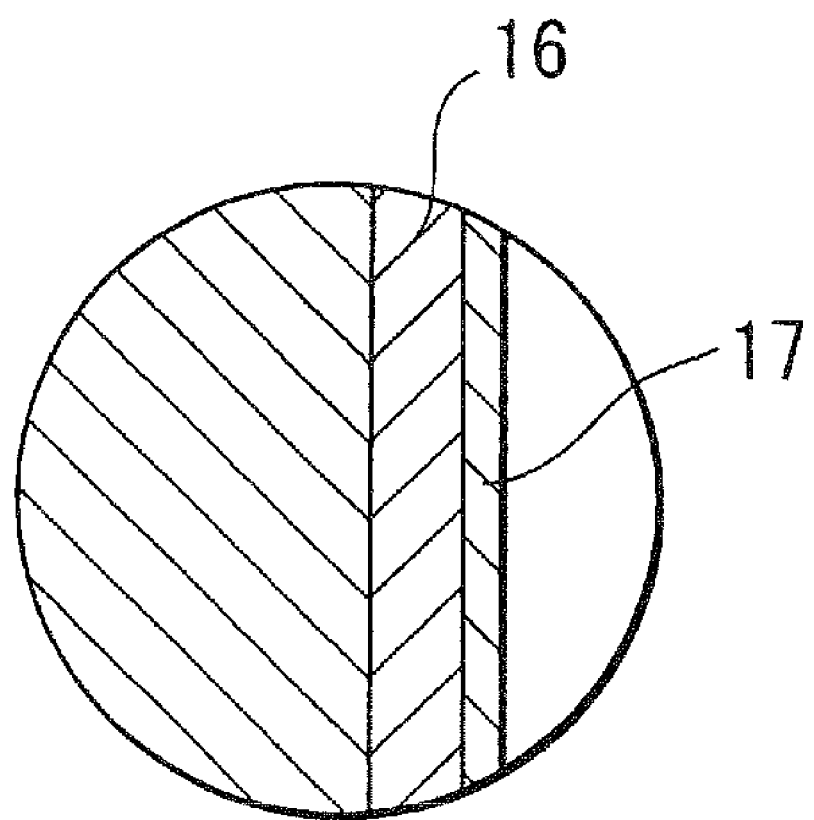
FIG. 2 is a partial sectional view of the screw according to the embodiment of the invention.

A preferred embodiment of the present invention will be described with reference to the accompanying drawings. FIG. 1 is a side view illustrating a screw, that is to say, a bolt, according to an embodiment of the present invention. FIG. 2 is a partial sectional view illustrating the screw according to the above embodiment. As shown in FIG. 1, a bolt 1 is a crank pulley bolt applied for an automobile engine and includes a head 11, a flange 12 formed at the undersurface of the head 11 and a shank 15 processed by a thread 14 extending in the direction perpendicular to a bearing surface 13 of the flange 12 at the central portion of the bearing surface 13.

FIG. 2 illustrates a magnified view of the portion of P in FIG. 2. As shown in FIG. 2, a zinc plating treatment forms a zinc plating layer 16 on the (metallic) surface of the bolt 1. Here, the thickness of the zinc plating layer 16 is set to be within the range of an appropriate thickness necessary for general application so that sufficient corrosion resistance can be ensured.

A treatment of a chemical conversion coating of trivalent chromium forms also a chemical conversion coating 17 of trivalent chromium on top of the zinc plating layer 16. In this treatment of the chemical conversion coating of trivalent chromium, a conventional general processing solution with processing conditions is modified to dilute the concentration of the processing solution. Consequently, the thin and soft chemical conversion coating 17 of trivalent chromium is generated. In this case, the chemical conversion coating 17 of trivalent chromium contains trivalent chromium as the substantial component thereof and no other metal compositions. Also, no $SiO_2$-containing layer or coating is added on the surface of the chemical conversion coating 17 of trivalent chromium. The layer thickness of the chemical conversion coating 17 of trivalent chromium is selected from within the range of 50 nm or more to less than 100 nm and is set to 80 nm in this case. According to the above treatment, the chemical conversion coating 17 of trivalent chromium is modified so as to have the equivalent characteristic to a conventional hexavalent chromate conversion coating. To be more specific, when a bolt of a hexavalent chromate treatment is tightened, the bolt contacts with a fastened member and generates high contact pressure at the bolt contact portion in the application of the bolt to a high axial force range. Thus, the hexavalent chromate conversion coating is rubbed off at the contact portion to cause the zinc plating layer thereunder to be exposed. The zinc plating layer presents a friction 10% to 50% higher than the hexavalent chromate conversion coating, so that the loosening torque of the bolt with an exposed zinc plating layer presents a torque 10% to 50% higher than the bolt without an exposed zinc plating layer. Thus, the chemical conversion coating 17 of trivalent chromium is formed to be thin and soft so that the zinc-based plating layer 16 can be exposed on the surface because the chemical conversion coating 17 of trivalent chromium is rubbed off at the contact portion of the bolt 1, especially the bearing surface 13, at the contact pressure enough to rub off a hexavalent chromate conversion coating by tightening the bolt 1 to make the bolt 1 contact the fastened member.

In addition, the modified chemical conversion coating 17 of trivalent chromium may be formed only on the contact portion of the bolt 1, especially the head 11, the bearing surface 13 of the flange 12, the shank 15 or a part of the thread 14 to the fastened member. In this case, it is preferable to select the contact portion at which higher contact pressure is generated.

Thus, the chemical conversion coating 17 of trivalent chromium has the hardness characteristic equivalent to the conventional hexavalent chromate conversion coatings. When the bolt 1 is tightened with a fastened member, the bolt 1 generates high contact pressure at the bearing surface 13 thereof in the application of the bolt to a high axial force range because of the same mechanism as the bolt of the hexavalent chromate treatment. And the chemical conversion coating 17 of trivalent chromium is rubbed off to cause the zinc plating layer 16 thereunder to be exposed. Consequently, it is possible to achieve the torque characteristic approximately equivalent to the hexavalent chromate conversion coatings 17 because of a friction force of the zinc plating layer 16 which is 10% to 50% higher than the chemical conversion coating of trivalent chromium and, especially, to improve greatly the loosening torque of the bolt 1. In addition, even if the contact pressure enough to rub off the hexavalent chromate conversion coatings is generated in the bolt treated by conventional general chemical conversion coatings of trivalent chromium, the chemical conversion coatings of trivalent chromium are not rubbed off, so that the zinc plating is not exposed. In comparison between same axial forces, the loosening torque of the bolt 1 treated by the chemical conversion coating of trivalent chromium according to the embodiment is 10% to 50% higher than the bolt treated by general chemical conversion coatings of trivalent chromium.

Figure 3:
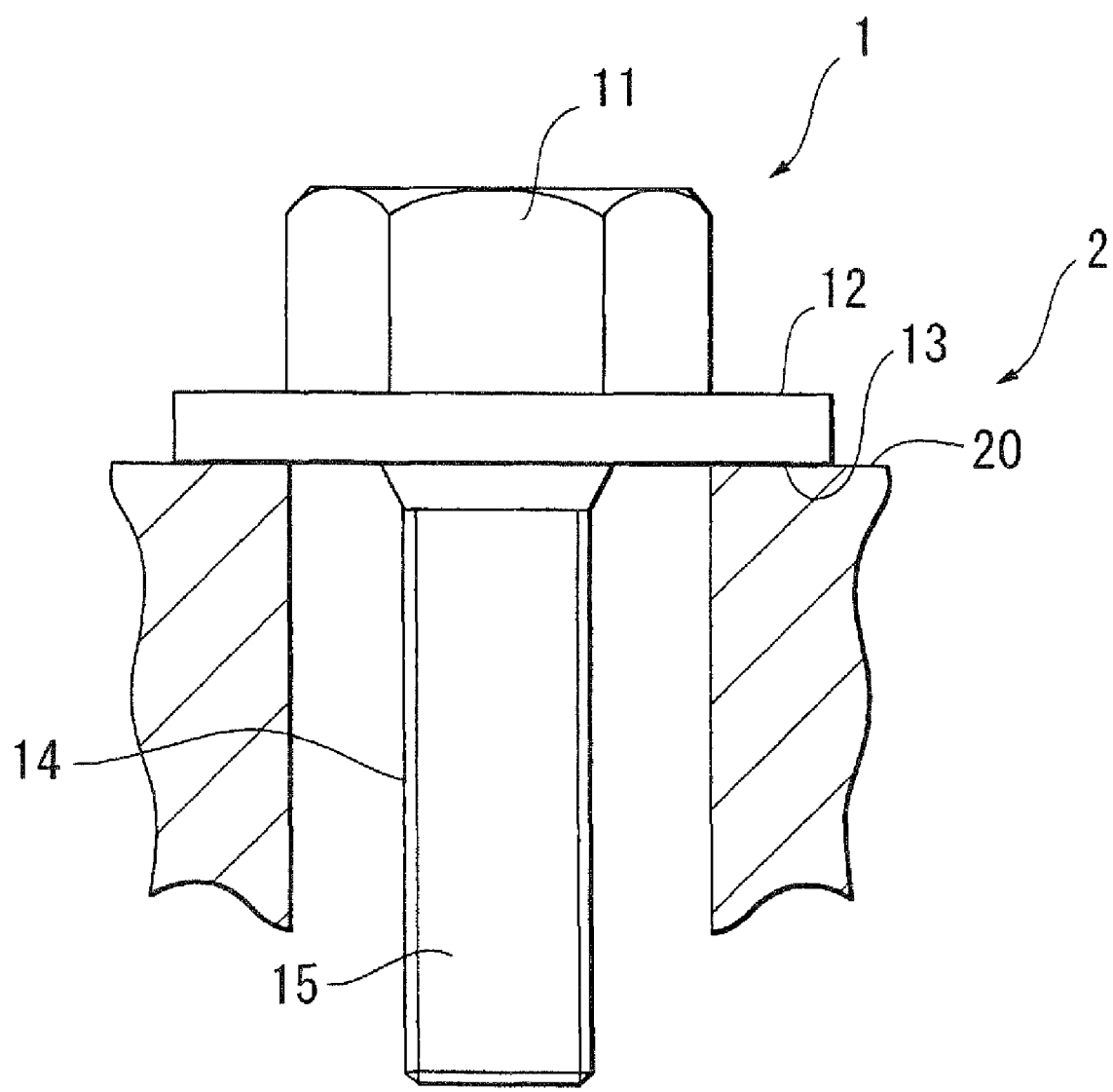
FIG. 3 is a partial sectional side view of a screw fastening structure using the screw according to the embodiment of the invention.

FIG. 3 shows a screw fastening structure using the bolt 1. In this screw fastening structure 2 shown in FIG. 3, a crank sprocket (not shown in the figure) and a crank pulley 20 are installed in sequence on the end of a crankshaft (not shown in the figure). Then, the bolt 1 is screwed into a threaded hole on the end of the crankshaft for tightening. In this case, since high contact pressure is generated in the bearing surface 13 of the bolt 1, the chemical conversion coating 17 of trivalent chromium is rubbed off at the bearing surface 13 to cause the zinc plating layer 16 thereunder to be exposed. Consequently, since the zinc plating layer 16 has a higher friction force than the chemical conversion coating 17 of trivalent chromium, it is possible to achieve the torque characteristic approximately equivalent to the hexavalent chromate conversion coatings. Especially, with respect to the loosening torque of the bolt 1, it is possible to achieve a torque characteristic 10% to 50% higher than the hard-plated bolt treated by the conventional chemical conversion coatings of trivalent chromium.

In addition, also in the screw fastening structure 2, the modified chemical conversion coating 17 of trivalent chromium may be formed only on the contact portion of the bolt 1 to the fastened member, especially the head 11, the bearing surface 13 of the flange 12, the shank 15 or a part of the thread 14. In this case, it is preferable to select the contact portion at which higher contact pressure is generated. Thus, it is also possible to achieve the torque characteristic approximately equivalent to the hexavalent chromate conversion coatings. Especially, with respect to the loosening torque of the bolt 1, it is possible to achieve a torque characteristic 10% to 50% higher than the hard-plated bolt treated by the conventional chemical conversion coatings of trivalent chromium. In addition, in the screw fastening structure 2, it may be allowed to form the zinc-based plating layer 16 and then the chemical conversion coating 17 of trivalent chromium thereon at least at the contact portion of the metal member side in place of the bolt 1 in a similar way. Thus, it is also possible to achieve the same effect.

In addition, in the above-mentioned embodiments, a bolt is exemplified as a screw and a screw fastening structure according to the present invention. It may be allowed to adopt the same constitution to a nut, or a male screw member or a female screw member assembled in machine parts. Thus, it is also possible to achieve the same operation and effect.

First Embodiment

Figure 4:
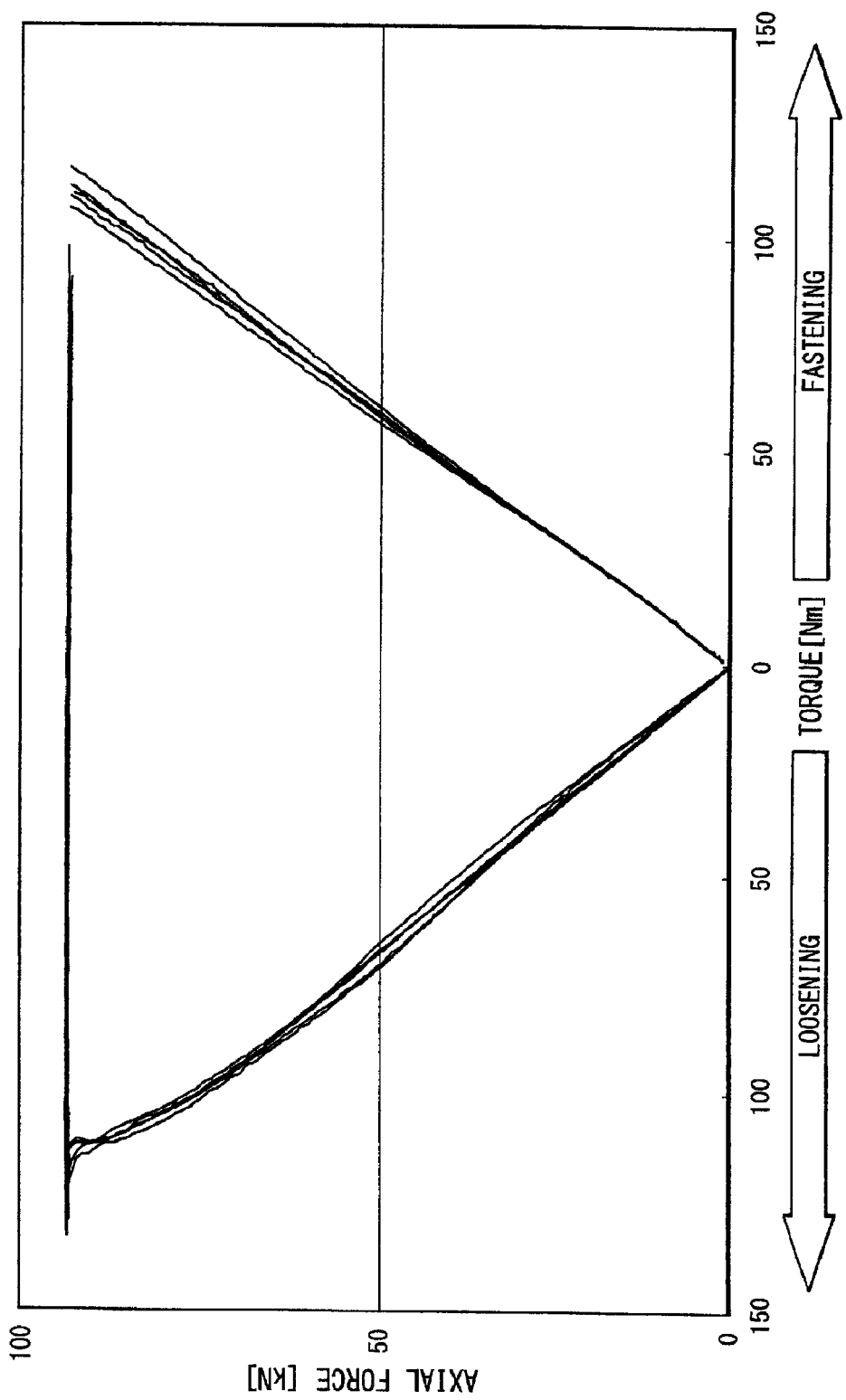
FIG. 4 is a diagram representing Torque vs. Axial Force in a bolt of the new modified treatment of the chemical conversion coating of trivalent chromium according to the present invention.
Figure 5:
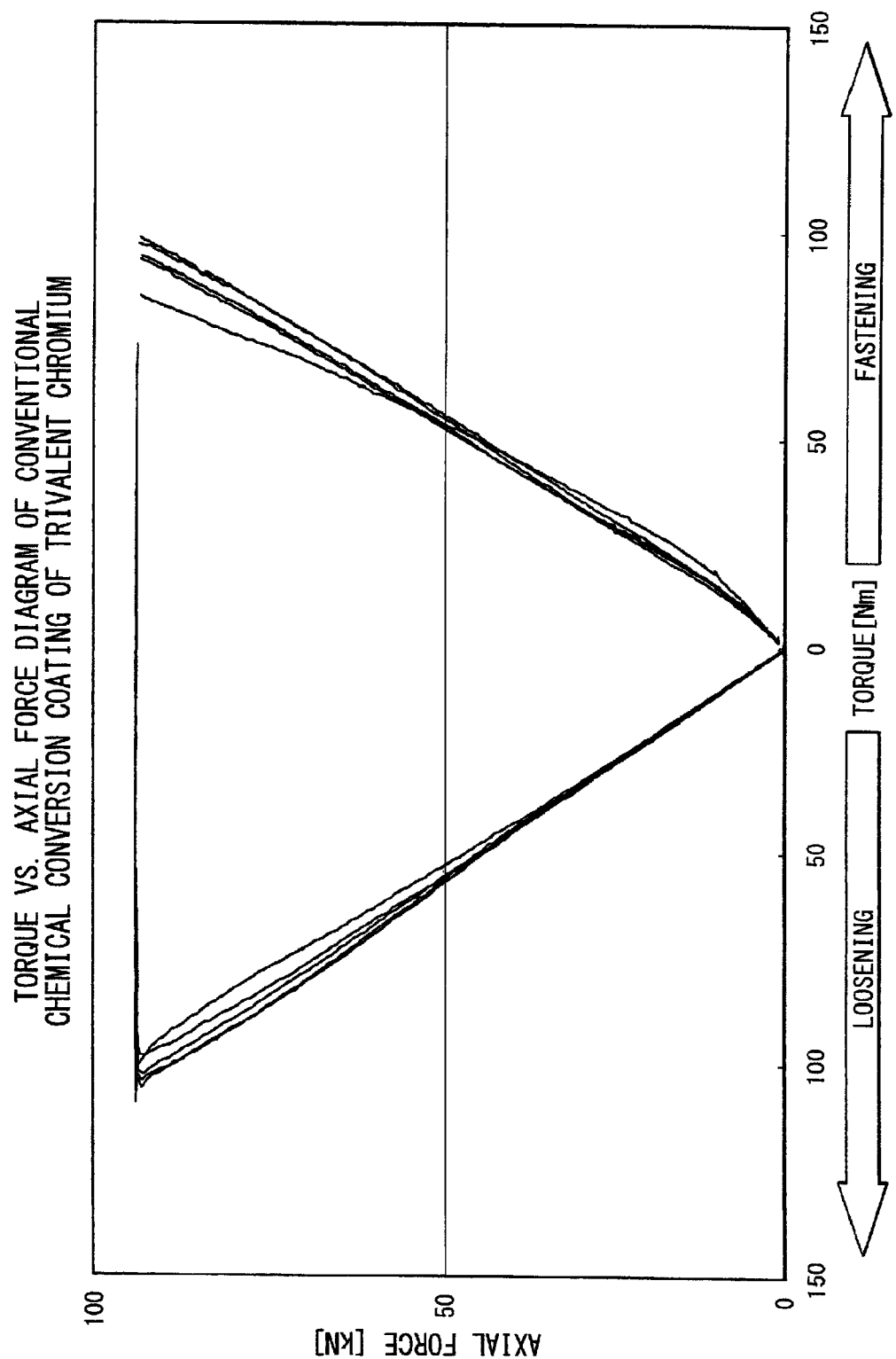
FIG. 5 is a diagram representing Torque vs. Axial Force in a bolt of a conventional general treatment of chemical conversion coatings of trivalent chromium.
Figure 6:
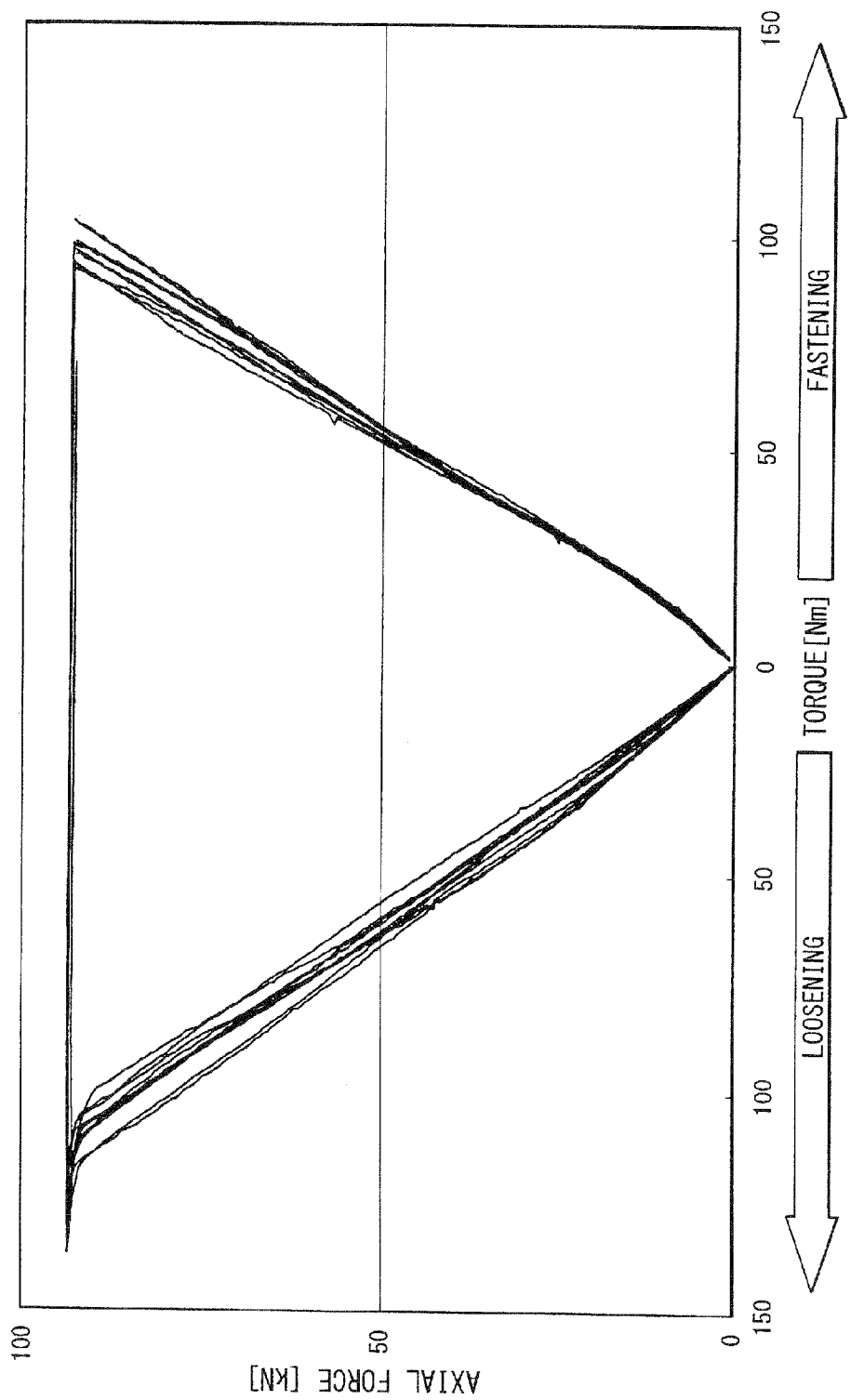
FIG. 6 is a diagram representing Torque vs. Axial Force in a bolt of a conventional hexavalent chromate treatment.

A Torque vs. Axial Force diagram of the new chemical conversion coating of trivalent chromium in FIG. 4 shows the confirmation results on specifications of the bolt treated by the modified chemical conversion coating of trivalent chromium. In addition, FIG. 5 shows a Torque vs. Axial Force diagram of the bolt treated by a conventional general chemical conversion coating of trivalent chromium. FIG. 6 shows a Torque vs. Axial Force diagram of the bolt of a conventional hexavalent chromate treatment. As obvious from FIG. 4 to FIG. 6, it is possible to achieve the torque characteristic approximately equivalent to the bolt of a conventional hexavalent chromate treatment with respect to the bolt treated by the modified chemical conversion coating of trivalent chromium and the high loosening torque characteristic equivalent to the bolt of a hexavalent chromate treatment especially with respect to the bolt applied to a high axial force with a demand for a high fastening force. In addition, in a corrosion resistance test after the subjection of heat deterioration which simulates such environment as is exposed to elevated temperatures (80 degrees centigrade or above) in an engine room like a crank pulley bolt, it has been confirmed that the bolt treated by the modified chemical conversion coating of trivalent chromium presents superior corrosion resistance characteristic to the bolt of a conventional hexavalent chromate treatment.

While the preferred embodiments shown in the figures according to the present invention have been illustrated and described, it is apparent that those of ordinary skill in the art could easily change and modify the invention. Accordingly, any variations and modifications thereof should be covered in the scope of the present invention.

What is claimed is:

1. A screw fastening structure comprising metal members fastened together by a tightened screw,
wherein a zinc-based plating layer is formed on at least a contact portion of either the metal member or the screw, and a layer of a hexavalent chromium-free chemical conversion coating of trivalent chromium is formed on the zinc-based plating layer; and
wherein the layer of the chemical conversion coating of trivalent chromium has a thickness in a range of 50 to 100 nm and is adapted so that the zinc-based plating layer is exposed due to rubbing off of the layer of the chemical conversion coating of trivalent chromium at the contact portion by tightening the screw.

* * * * *